US012472608B2

(12) United States Patent
Hasselskog et al.

(10) Patent No.: US 12,472,608 B2
(45) Date of Patent: Nov. 18, 2025

(54) TOOL FOR REMOVING A CONSTANT VELOCITY JOINT

(71) Applicant: Wallmek i Kungälv AB, Kungälv (SE)

(72) Inventors: Martin Hasselskog, Kärna (SE); Sten Johansson, Lycke (SE)

(73) Assignee: Wallmek i Kungälv AB, Kungälv (SE)

( * ) Notice: Subject to any disclaimer, the term of this patent is extended or adjusted under 35 U.S.C. 154(b) by 0 days.

(21) Appl. No.: 18/758,952

(22) Filed: Jun. 28, 2024

(65) Prior Publication Data

US 2025/0001567 A1 Jan. 2, 2025

(30) Foreign Application Priority Data

Jun. 30, 2023 (EP) ..................................... 23182584

(51) Int. Cl.
*B25B 27/02* (2006.01)
*B25B 27/00* (2006.01)

(52) U.S. Cl.
CPC ........ *B25B 27/023* (2013.01); *B25B 27/0035* (2013.01); *F16D 2250/0084* (2013.01)

(58) Field of Classification Search
CPC .... B25B 27/023; B25B 27/0035; B25B 27/02
See application file for complete search history.

(56) References Cited

U.S. PATENT DOCUMENTS

| | | | | |
|---|---|---|---|---|
| 5,285,704 | A | 2/1994 | Santana Gonzalez | |
| 8,739,376 | B1 | 6/2014 | Vidmar | |
| 2008/0010800 | A1 | 1/2008 | Bergman et al. | |
| 2021/0245347 | A1* | 8/2021 | Robbins .................. | B25D 1/16 |

FOREIGN PATENT DOCUMENTS

| | | | |
|---|---|---|---|
| DE | 6901578 | U | 10/1969 |
| DE | 202004009756 | U1 | 9/2004 |

OTHER PUBLICATIONS

English translation/FOR DE 6901578 U (Year: 1969).*
European Patent Office, Partial European Search Report, Application No. 23182584.5, Nov. 24, 2023, 15 pages.
European Patent Office, Extended European Search Report, Application No. 23182584.5, Feb. 9, 2024, 14 pages.

* cited by examiner

*Primary Examiner* — Jason L Vaughan
*Assistant Examiner* — Amanda Kreiling
(74) *Attorney, Agent, or Firm* — Quarles & Brady LLP

(57) ABSTRACT

A tool for removing a constant velocity (CV) joint from a driveshaft. The tool can include a frame with a first end arranged at a vehicle side of the CV joint and a second end arranged at a wheel side of the CV joint. The tool can further include an engagement member arranged at the first end of the frame. The engagement member can at least partly enclose the driveshaft and can engage with an inner race of the CV joint from the vehicle side of the CV joint. During use, the tool can be arranged such that a force applied to the frame at the second end of the frame in a direction away from the CV joint is transferred through the frame to the engagement member causing the engagement member to engage the inner race of the CV joint, thereby removing the CV joint from the driveshaft.

20 Claims, 12 Drawing Sheets

TOOL FOR REMOVING A CONSTANT VELOCITY JOINT

CROSS-REFERENCE TO RELATED APPLICATIONS

The present application claims the benefit of and priority to European Patent Application No. 23182584.5 filed on Jun. 30, 2023, the entire disclosure of which is incorporated herein by reference.

TECHNICAL FIELD

The present disclosure relates generally to a tool for removing a constant velocity (CV) joint from a driveshaft of a vehicle.

BRIEF DESCRIPTION OF THE DRAWINGS

Objects, features and advantages of embodiments of the invention will appear from the following detailed description, reference being made to the accompanying drawings, in which.

DETAILED DESCRIPTION

Figure 1A:
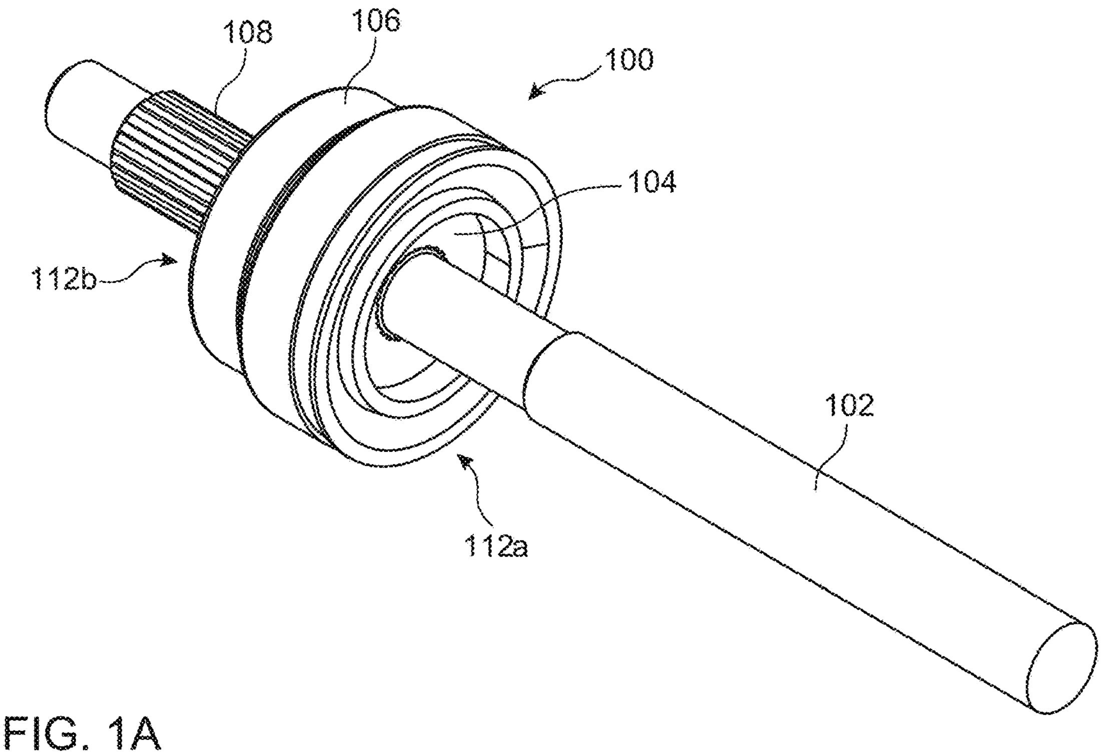
FIG. 1A is a perspective view of a CV joint attached to a driveshaft, in accordance with some embodiments.

Constant velocity (CV) joints are essential components in many automotive applications, for providing a flexible connection between the driveshaft and the wheel assembly. Over time, CV joints, or parts thereof, may wear out or become damaged, requiring replacement or repair to maintain the proper functioning of the vehicle. A CV joint typically comprises a housing that is enclosing a bearing. The CV joint is then attached to an end of the driveshaft through an inner race of the bearing. The bearing may be protected by a boot on a vehicle side of the CV joint. A failing CV joint may e.g., be caused by damage to the boot or bearing.

The removal of a CV joint from a driveshaft to which it is mounted typically involves the use of specialized tools to disengage the joint from the driveshaft. Currently available tools for CV joint removal often involves complex and intricate procedures. Moreover, conventional removal techniques may inadvertently damage the driveshaft or adjacent parts, leading to additional repair or replacement costs. In addition, it can be cumbersome to apply enough force to remove the CV joint due to limited space when the driveshaft is still mounted on the vehicle, in particular if the CV joint is stuck. This means that sometimes, the entire driveshaft has to be removed, which takes time and increases the risk of damaging the transmission of the vehicle.

One common approach is to employ a hammer and punch to remove the CV joint by asserting a force from a vehicle side of the CV joint. However, this is a cumbersome and time-consuming process due to the limited space as mentioned above. It is especially hard to reach around the CV joint and position the punch in the correct place when the driveshaft is still mounted on the vehicle.

Another approach is to use a more complex tool which in one end clamps onto the driveshaft and which in the other end comprises means for pulling the CV joint away from the driveshaft. However, these tools has the risk of damaging the CV joint by separating the housing from the inner race of the ball bearing being attached to the driveshaft. Furthermore, they lack adaptability to different vehicle models, requiring multiple tools for various applications.

Thus, there is a need for an improved tool that enables efficient removal of a CV joint from a driveshaft with reduced risk of damaging. This tool should be simple, user-friendly, and compatible with a wide range of vehicle models, ensuring versatility and widespread applicability in the automotive industry.

The herein disclosed technology seeks to mitigate, alleviate or eliminate one or more of the above-identified deficiencies and disadvantages in the prior art to address various problems relating to the removal of CV joints from a driveshaft.

The presently disclosed technology provides a tool which enables a safe, reliable and efficient removal of a CV joint from a driveshaft, while reducing the risk of damage to the CV joint, driveshaft or surrounding components. Furthermore, its simplicity and versatility contribute to increased productivity and cost-effectiveness for mechanics and repair facilities.

Various aspects and embodiments of the tool for removing a CV joint from a driveshaft are defined below and in the accompanying independent and dependent claims.

According to an aspect of the presently disclosed technology, there is provided a tool for removing a CV joint from a driveshaft. The CV joint comprises a housing enclosing a ball bearing. Further, the CV joint is attached to an end of the driveshaft through an inner race of the ball bearing when mounted thereto. The tool comprises a frame comprising a first and a second end. The frame is configured to extend around the housing of the CV joint such that, during use, the first end of the frame is arranged at a vehicle side of the CV joint, and the second end of the frame is arranged at a wheel side of the CV joint. The tool further comprises an engagement member. The engagement member is arranged at the first end of the frame. The engagement member is configured to at least partly enclose the driveshaft and to engage with the inner race of the CV joint from the vehicle side of the CV joint. During use, the tool is arranged such that a force, applied to the frame at the second end in a direction away from the CV joint, is transferred through the frame to the engagement member, causing the engagement member to engage the inner race, thereby removing the CV joint from the driveshaft.

A possible associated effect of the presently disclosed technology is that the tool allows the force to be applied from a wheel side of the CV joint, while the tool engages the CV joint from the vehicle side. Thus, the tool may be advantageous in that it both simplifies the process, but also reduces the risk of damaging any parts of the vehicle of the CV joint itself.

The disclosed aspects and preferred embodiments may be suitably combined with each other in any manner apparent to anyone of ordinary skill in the art. Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will, in the following, be further clarified with reference to the embodiments described hereinafter.

In the following description, some embodiments of the disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present inventive concept may be practiced without these specific details. In other instances, well known constructions or functions are not described in detail, so as not to obscure the present inventive concept. In the following description of exemplary embodiments, the same reference numerals denote the same or similar components. The term exemplary is in the present context to be understood as serving as an instance, example or illustration.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first element could be termed a second element, and, similarly, a second element could be termed a first element, without departing from the scope of the embodiments. The first element and the second element are both elements, but they are not the same element.

The tool as disclosed herein, along with its components, is preferably made from a rigid material such as any suitable metal or metal alloy (e.g., cast iron, steel, etc.). It may however be made from other materials depending on specific applications and specification as will be obvious for one skilled in the art. The method for manufacturing such a tool using a metallic material is considered to be well known in the art and for the sake of brevity and conciseness omitted in the following.

FIG. 1A is a perspective view of a constant velocity (CV) joint 100 attached to a driveshaft 102. In particular, FIG. 1A illustrates a typical CV joint of a motorized vehicle, such as a car. The tool for removing the CV joint 100 as further explained below may in particular be configured to remove an outer CV joint of the vehicle. By outer CV joint it is herein meant a CV joint closest to a wheel of the vehicle, as opposed to an inner CV joint towards a transmission of the vehicle. It is to be noted that in the illustrated example, only an outer portion from an outer end 110 of the driveshaft 102 is shown. An opposite end of the driveshaft 102 may be attached to said inner CV joint.

The CV joint 100 comprises a housing 106. The housing 106 encloses a bearing of the CV joint 100. The bearing is typically a ball bearing. The CV joint 100 is connected to the drive shaft 102 through an inner race 104 of the bearing.

Throughout the present disclosure, reference is made to a vehicle side 112*a* and wheel side 112*b* of the CV joint 100. By vehicle side 112*a* it is herein meant a side of the CV joint 100 towards the vehicle. In other words, the vehicle side 112*a* corresponds to the side of the CV joint 100 at which the driveshaft 102 is attached. The vehicle side 112*a* of the CV joint may also be referred to as an "inside", or "inner side" of the CV joint 100. The wheel side 112*b* thus refer to the side of the CV joint 100 towards the wheel connected to the CV joint 100. The wheel side 112*b* of the CV joint 100 may also be referred to as an "outside" or "outer side" of the CV joint 100. The wheel side 112*b* of the CV joint 100 (or more specifically the housing 106) is provided with an axle shaft 108. The axle shaft 108 is configured to be attached to a wheel hub. The axle shaft 108 may also be referred to as a wheel hub connection.

The CV joint may further comprise a boot. The boot may be made of a flexible material such as rubber or plastic. The boot may be arranged to protect a wheel side of the CV joint (in particular the bearing) from e.g., dirt or other particles. The boot is typically removed from the CV joint 100 before removing the CV joint from the driveshaft 102.

Figure 1B:
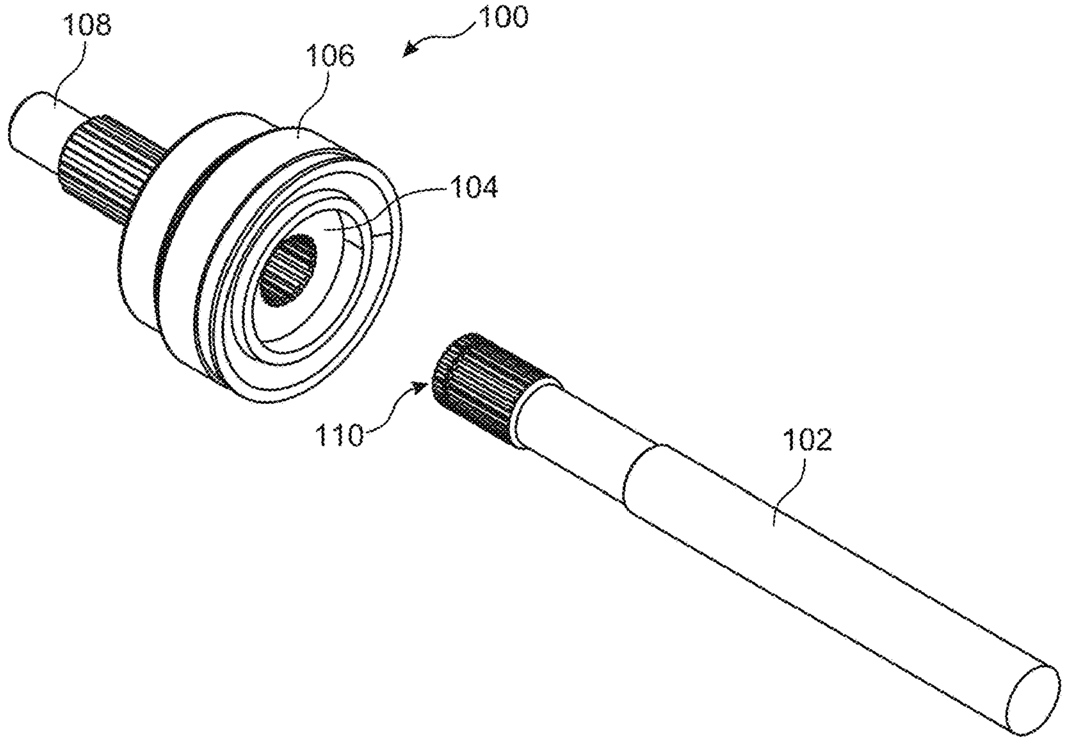
FIG. 1B is a perspective view of a CV joint removed from the driveshaft, in accordance with some embodiments.

FIG. 1B is a perspective view of the CV joint after it has been removed from the driveshaft. As illustrated herein, the end 110 of the driveshaft 102 is shaped to engage with an inside of the inner race 104 such that a rotational moment of the driveshaft 102 can be translated into the inner race 104, which in turn translates the rotational moment into the housing 106 and axle shaft 108. The rotation of the axle shaft 108 finally translates into a rotation of the wheel.

It is to be noted that the present CV joint 100 is merely an illustrative example representative of a typical CV joint 100 for improved understanding. The CV joint 100 may comprise additional parts. Further, the parts of the CV joint 100 which are not show are to be considered well known in the art. Therefore, and for the sake of brevity, further description of the construction of the CV joint 100 will be left out.

Figure 2A:
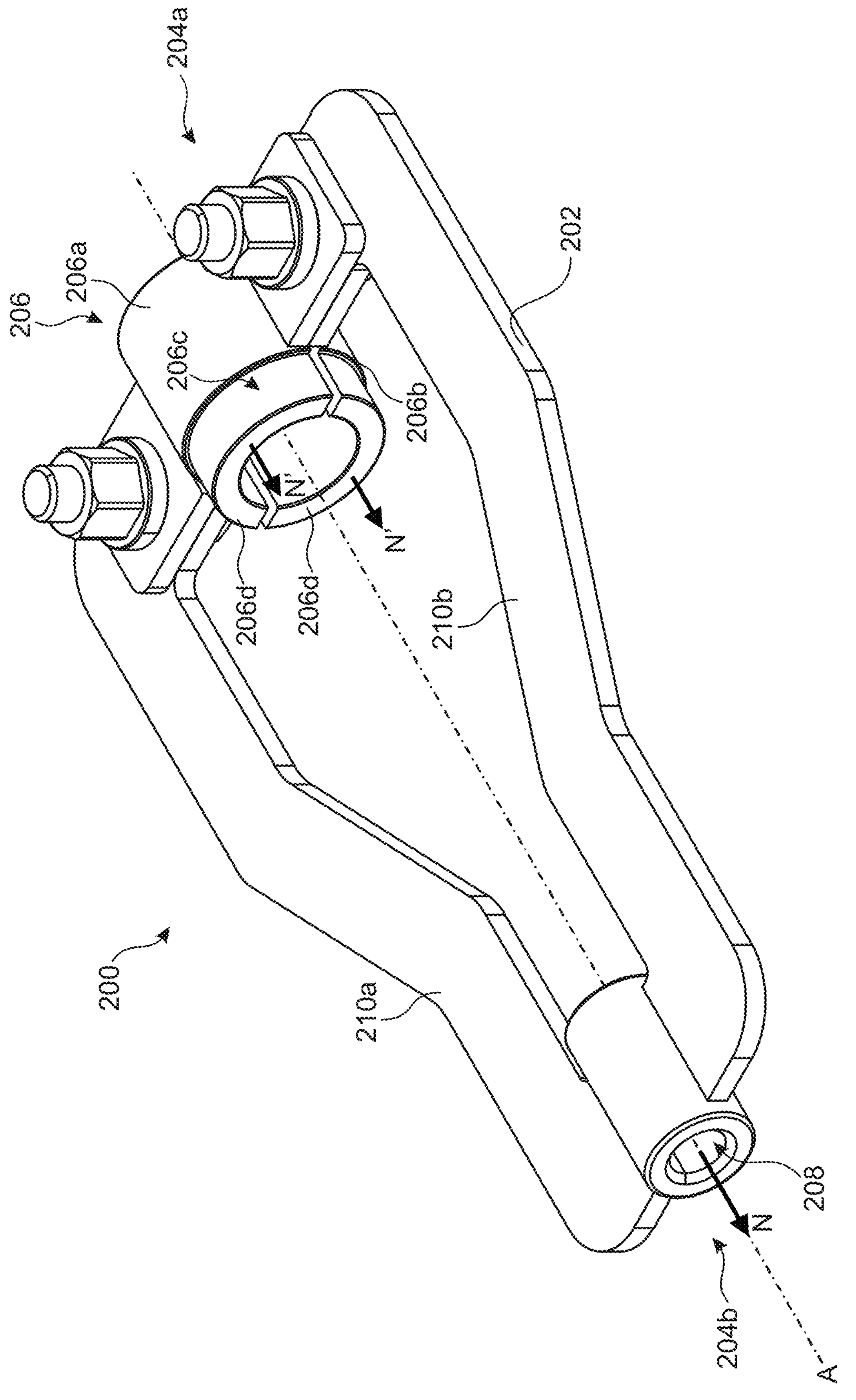
FIG. 2A is a perspective view of a tool for removing a CV joint from a driveshaft, in accordance with some embodiments.
Figure 2B:
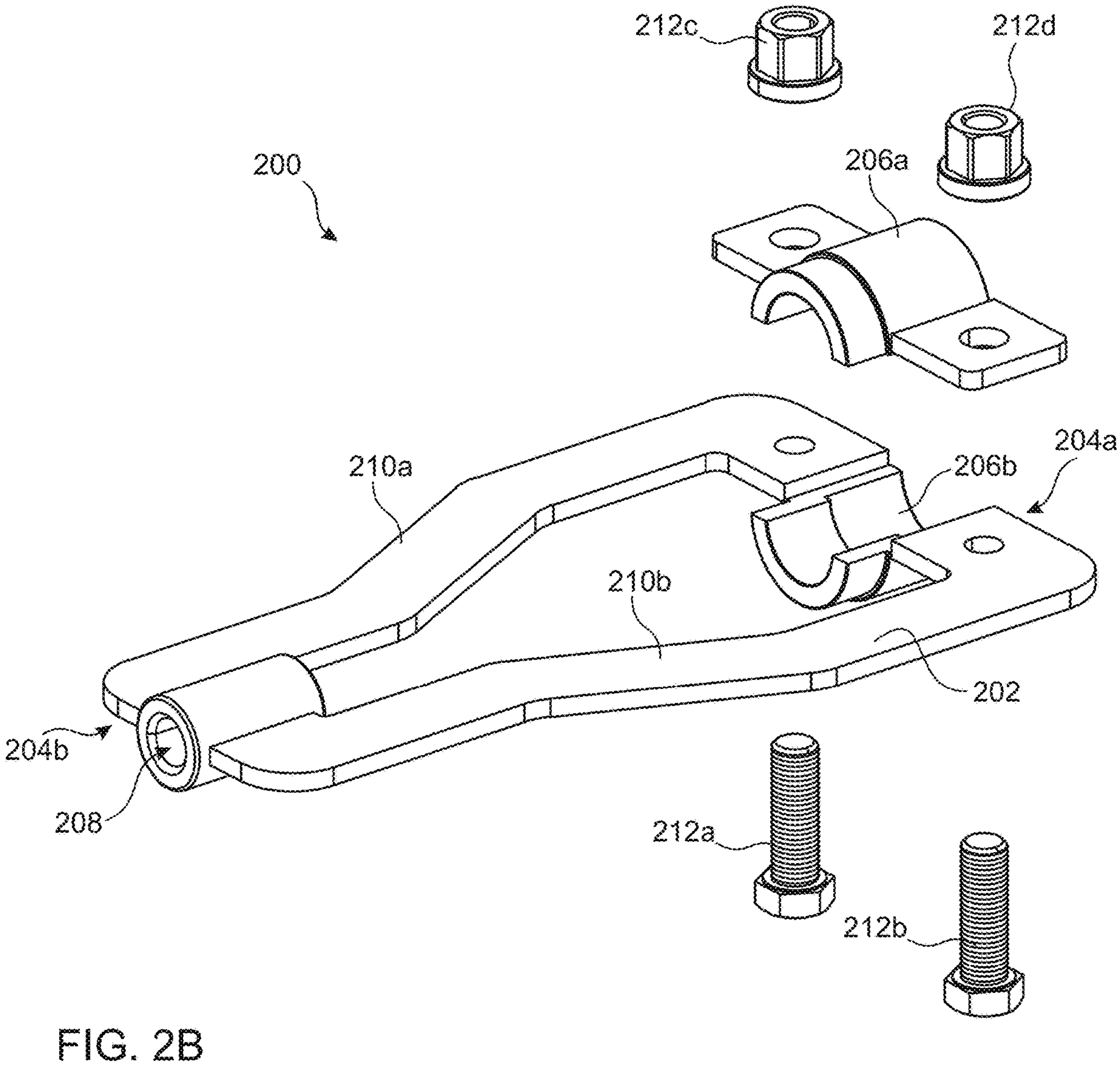
FIG. 2B is an exploded perspective view of the tool for removing a CV joint from a driveshaft, in accordance with some embodiments.
Figure 2C:
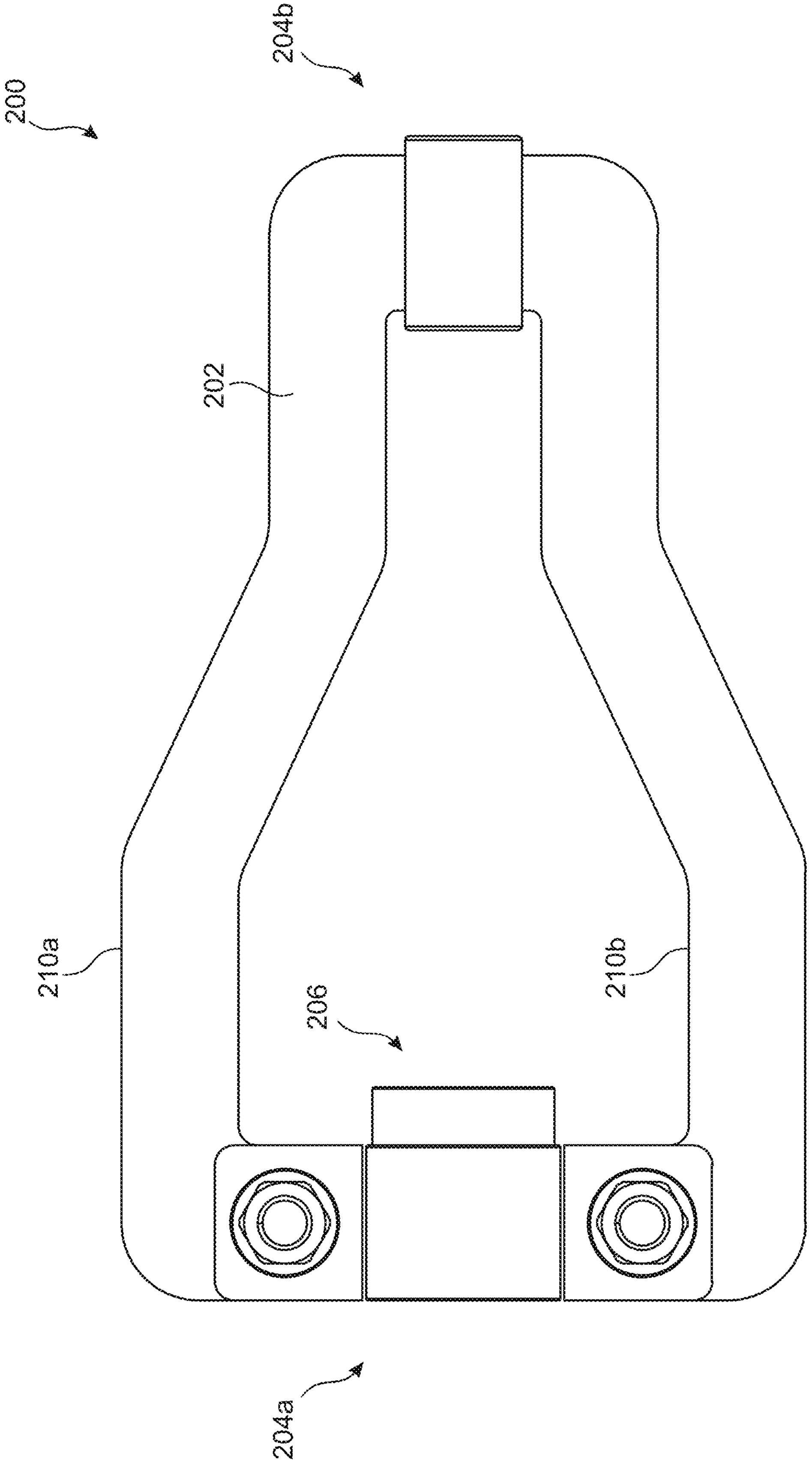
FIG. 2C is a top view of the tool for removing a CV joint from a driveshaft, in accordance with some embodiments.

FIGS. 2A-2C illustrate a tool 200 for removing a CV joint 100 from a driveshaft 102 in accordance with some embodiments. More specifically, FIG. 2A is a perspective view of the tool, FIG. 2B is an exploded perspective view of the tool 200, and FIG. 2C is a top view of the tool 200.

The tool comprises a frame 202 having a first and a second end 204*a*, 204*b*. The frame 202 is configured to extend around the housing 106 of the CV joint 100 such that, during use, the first end 204*a* of the frame 202 is arranged at a vehicle side 112*a* of the CV joint 100, and the second end 204*b* of the frame 202 is arranged at a wheel side 112*b* of the CV joint 100. In other words, the frame 202 has a shape such that the CV joint 100 can be arranged at a position between the first and second end 204*a*, 204*b* of the frame 202, i.e., within the frame 202. In the illustrated example, the frame 202 comprises a first and a second extension member 210*a*, 210*b*. The first and second extension member 210*a*, 210*b* are configured to extend on opposite sides of the CV joint 100 when in use. However, the frame 202 may in some embodiments comprise a single extension member, or more than two extension members.

The tool 200 further comprises an engagement member 206. The engagement member 206 is arranged at the first end 204*a* of the frame 202. The engagement member 206 is configured to, during use, at least partly enclose the driveshaft 102. By the wording “the engagement member enclosing the driveshaft 102”, it is herein meant that the engagement member wraps around or encircle the driveshaft to some extent. The wording “at least partly encloses” should thus be understood as the extent of the enclosure may vary depending on a specific realization of the present inventive concept. In other words, the engagement member 206 need not to completely encircle the driveshaft 102, but can encircle a portion of the driveshaft 102, i.e., either partially or fully. In the illustrated example, the driveshaft 102 is enclosed entirely by the engagement member 206 (and the frame 202).

It is to be noted that even though the engagement member 206 is configured to at least partly enclose the driveshaft 102 and thus be mounted to the driveshaft, the engagement member 206 is still able to move along the driveshaft 102. In other words, the engagement member 206 is not fixedly attached to the driveshaft 102. Thus, an inner diameter of the engagement member 206 may be greater than a diameter of the driveshaft 102.

The engagement member 206 is further configured to engage with the inner race 104 of the CV joint 100 from the vehicle side 112*a* of the CV joint 100 during use. By the wording “engage with” as in “engage with the inner race”, it is herein meant that the engagement member 206 abuts or comes in contact with the inner race 104. By the engagement member 206 at least partly enclosing the driveshaft 102, the engagement member 206 also engages the inner race 104 of the CV joint 100 at least partly around its circumference. In some embodiments, the engagement member 206 engages the inner race 104 on at least two points of contact on different (or opposite) sides of the driveshaft 102.

Having the engagement member 206 at least partly enclosing the driveshaft 102 may be advantageous in that it can be securely mounted around the driveshaft 102 to help in ensuring that the tool 200 is held in place during use. Thereby user friendliness can be improved. It may further allow the engagement member 206 to be aligned with the inner race 104 during use to provide for an improved application of the applied force. More specifically, an effect of the engagement member 206 as described herein may be that the risk of the inner race becoming offset from the driveshaft causing it to jam may be avoided. When using the common approach of employing a hammer and punch, the risk of that happening is greater due to the force being applied only at one point around the inner race each time.

In the example illustrated herein, the engagement member 206 comprises a protruding member 206*c*. The protruding member 206*c* protrudes in a direction towards the second end 204*b* of the frame 202, along a main axis A (shown in FIG. 2A) of the tool 200. During use of the tool, a distal end surface 206*d* of the protruding member 206 may engage the inner race 104 of the bearing of the CV joint. As will be further described below in connection e.g., with FIG. 3B-3D, the tool 200, during use, is arranged such that a force, applied to the frame 202 at the second end 204*b* in a direction away from the CV joint 100, is transferred through the frame 202 to the engagement member 206, causing the engagement member 206 to engage the inner race 104, thereby removing the CV joint 100 from the driveshaft 102. In FIG. 2A, the applied force is represented by the bold arrow denoted N. The force N is applied in the direction of the main axis A of the tool 200. As is further illustrated, the force transferred through the frame 202 to the engagement member 206 is herein represented by the bold arrows denoted N'. The engagement member 206 thus exerts the transferred force N' to the inner race 104 of the CV joint 100. The protruding member 206*c* may thus be advantageous in that it may serve as the main point of contact between the tool 200 and the CV joint 100. Thus, a majority of the applied force is transferred to the inner race through this main point of contact.

As shown in the exploded view of FIG. 2B, the engagement member 206 may be divided into a first and a second sub-member 206*a*, 206*b*. The first and second sub-member are, during use, arranged on two opposite sides of the driveshaft 102. In the illustrated example the second sub-member 206*b* of the engagement member 206 is fixedly mounted to the frame 202 at the first end 204*a*. The second sub-member 206*b* may be an integral part of the frame 202. The first sub-member 206*a* is on the other hand provided as a separate part. The first sub-member 206*a* may thus be removably attached to the frame 202. As an example, the first sub-member 206*a* may be attached to the frame 202 by fastening elements 212*a-d*, such as by bolts and nuts or any other suitable means. The engagement member 206 may thus be partly removably attached to the frame 202. This may be advantageous in that the tool 200 can be mounted for use around the driveshaft in an easy way.

In some embodiments, the second sub-member 206*b* of the engagement member 206 may also be removably attached to the frame 202. In other words, the second sub-member 206*b* may be provided as a separate part as the first sub-member 206*a* illustrated herein and attached to the frame 202 by the fastening elements 212*a-d*. In other words, the engagement member 206 may be completely removable from the frame 202. Having the entire engagement member 206 removably attached may be advantageous in that it may improve the adaptability of the tool 200. In particular, the engagement member 206 can be selected based on dimensions of the driveshaft 102 or the CV joint 100. Thus, the tool 200 can be made compatible with a variety of different vehicles.

The tool 200 may further comprise a force receiving member. The force receiving member may be arranged at the second end 204*b* of the frame 202. The force receiving member may be configured to receive the applied force during use. In other words, the force receiving member may be configured to exert the applied force to the second end 204*b* of the frame 202. The force receiving member may be any suitable device to which a force can be applied or by which a force can be generated. The force receiving member may for instance be a sliding hammer. Alternatively, the force receiving member may be adapted to receive a hammer blow. For instance, the force receiving member may be a flat and rigid surface on which a hammer blow can be applied. In yet a further example, the force receiving member may be configured to receive a force generated mechanically, by hydraulics or electrically. Enabling the force receiving member to be attached to the frame 202 at the second end 204*b* allows a wide range of ways of generating the force to remove the CV joint 100. A reason why is that it is less restricted by space, since it can be attached at the wheel side of the CV joint 100, instead of at the vehicle side.

The force receiving member may be fixedly attached to the frame 202. The force receiving member may for instance be an integral part of the frame 202. Alternatively, the force receiving member may be removably attached to the frame 202. Thus, the type of force receiving member can be selected based on a specific need. Further, the force receiving member can be attached to the frame 202 after the frame 202 and engagement member 206 has been arranged in place around the CV joint, thereby simplifying handling of the tool 200 during use.

The force receiving member may for instance be attached to the frame 202 through a connection element 208 of the frame 202. The connection element 208 may be arranged at the second end 204*b* of the frame 202. In the illustrated example, the connection element 208 is a hole. The hole is in the illustrated example provided as an integral part of the frame 202.

The force receiving member may thus be attached to the hole 208. The hole 208 may be a threaded hole. The force receiving member may thus be attached to the hole 208 by being screwed into the hole 208. The hole may be a threaded through hole. It is however to be noted that other ways of attaching the force receiving member to the second end 204*b* of the frame 202 may be possible as well. For instance, the connection element 208 may be a threaded element (such as a screw or a bolt) onto which the force receiving member is screwed. In a further example, the connection element 208 may comprise a spring-loaded pin for securing the force receiving member in a releasable manner.

The connection element 208 and engagement member 206 are advantageously centered around a common axis, herein the main axis A of the tool 200. This may be advantageous in that the applied force can be transferred to the engagement member 206 in an efficient way.

Figure 3A:
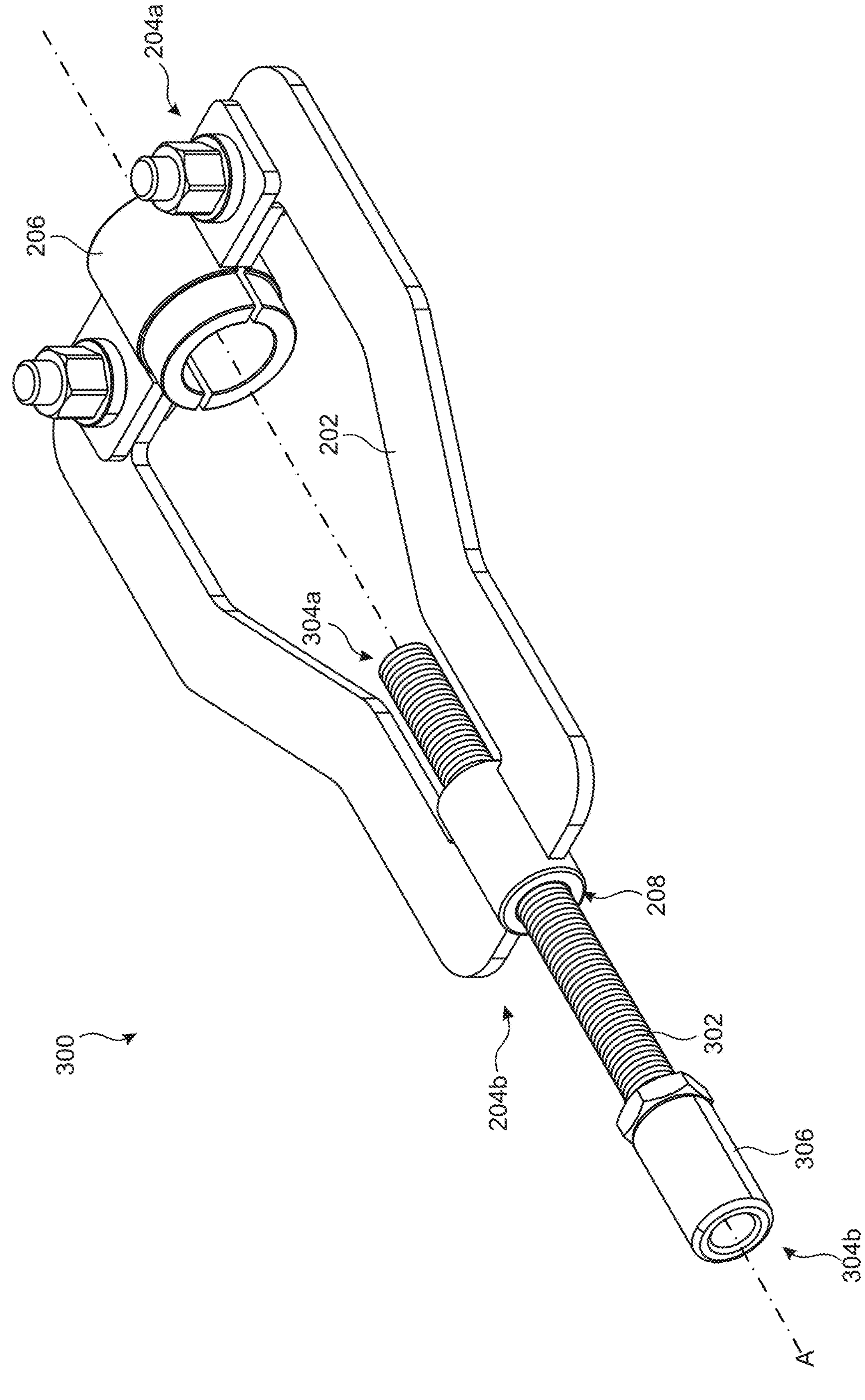
FIG. 3A is a perspective view of a tool for removing a CV joint from a driveshaft, in accordance with some embodiments.
Figure 3B:
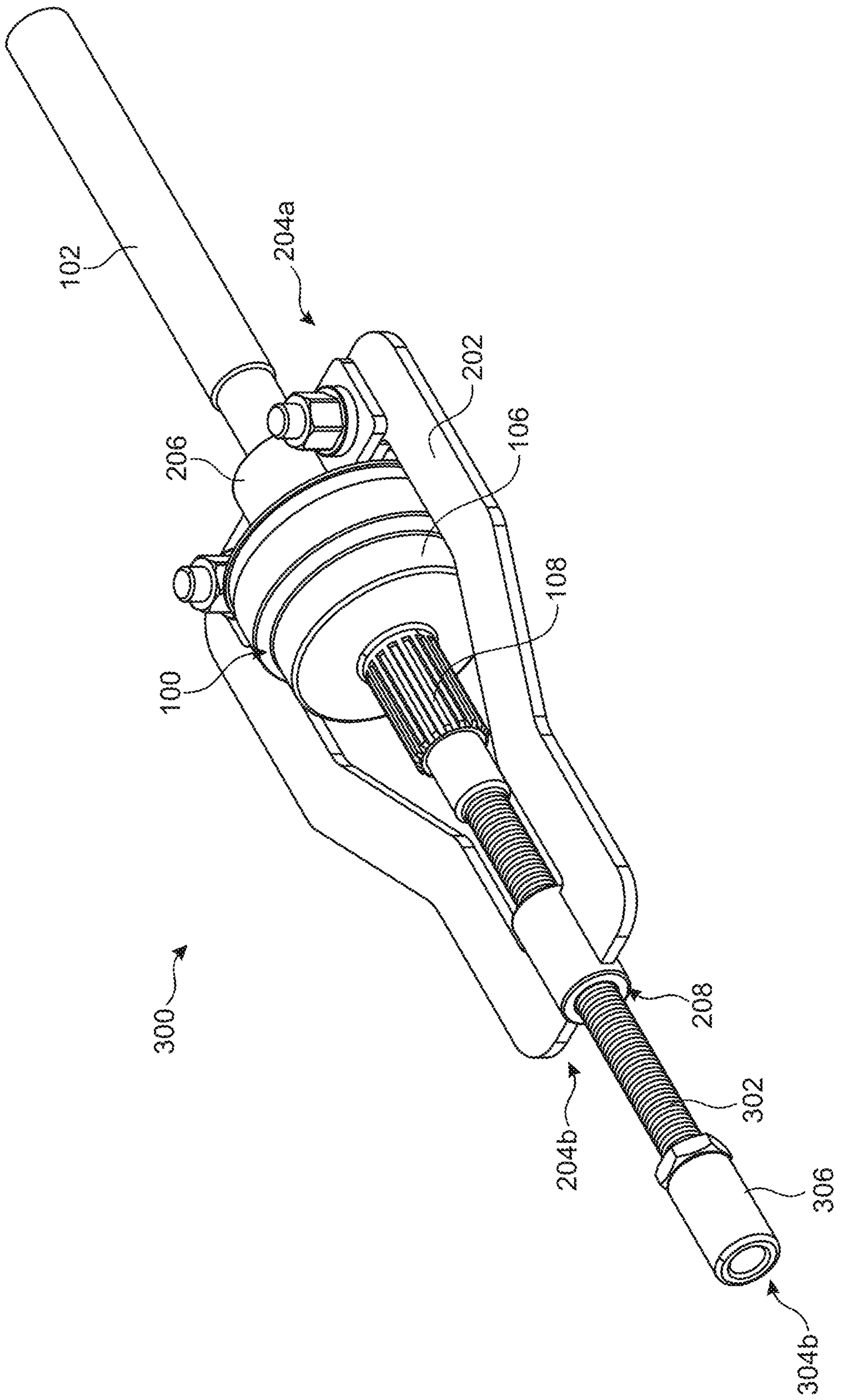
FIG. 3B is a first perspective view of the tool in FIG. 3A, during use, in accordance with some embodiments.
Figure 3C:
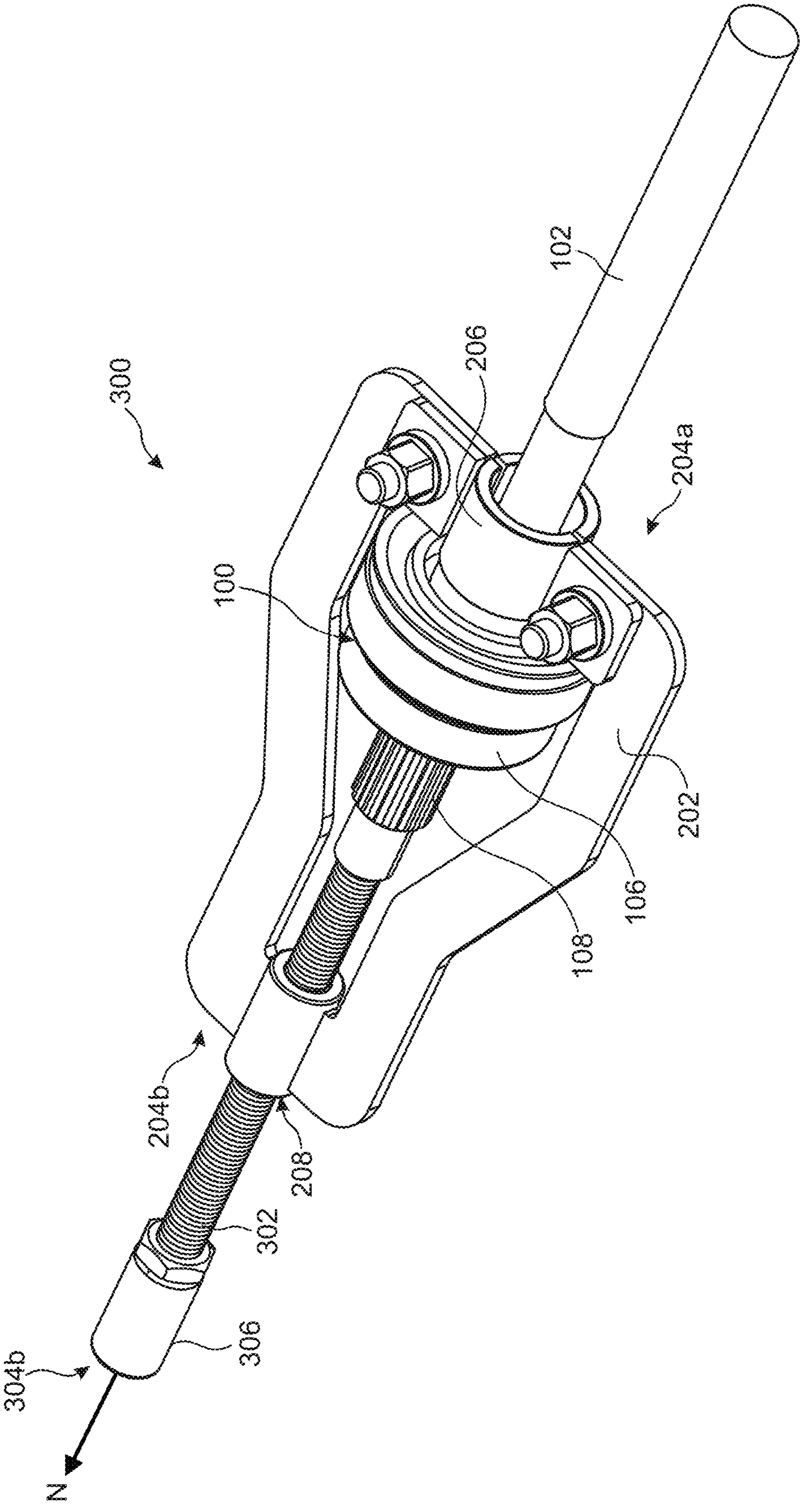
FIG. 3C is a second perspective view of the tool in FIG. 3A, during use, in accordance with some embodiments.
Figure 3D:
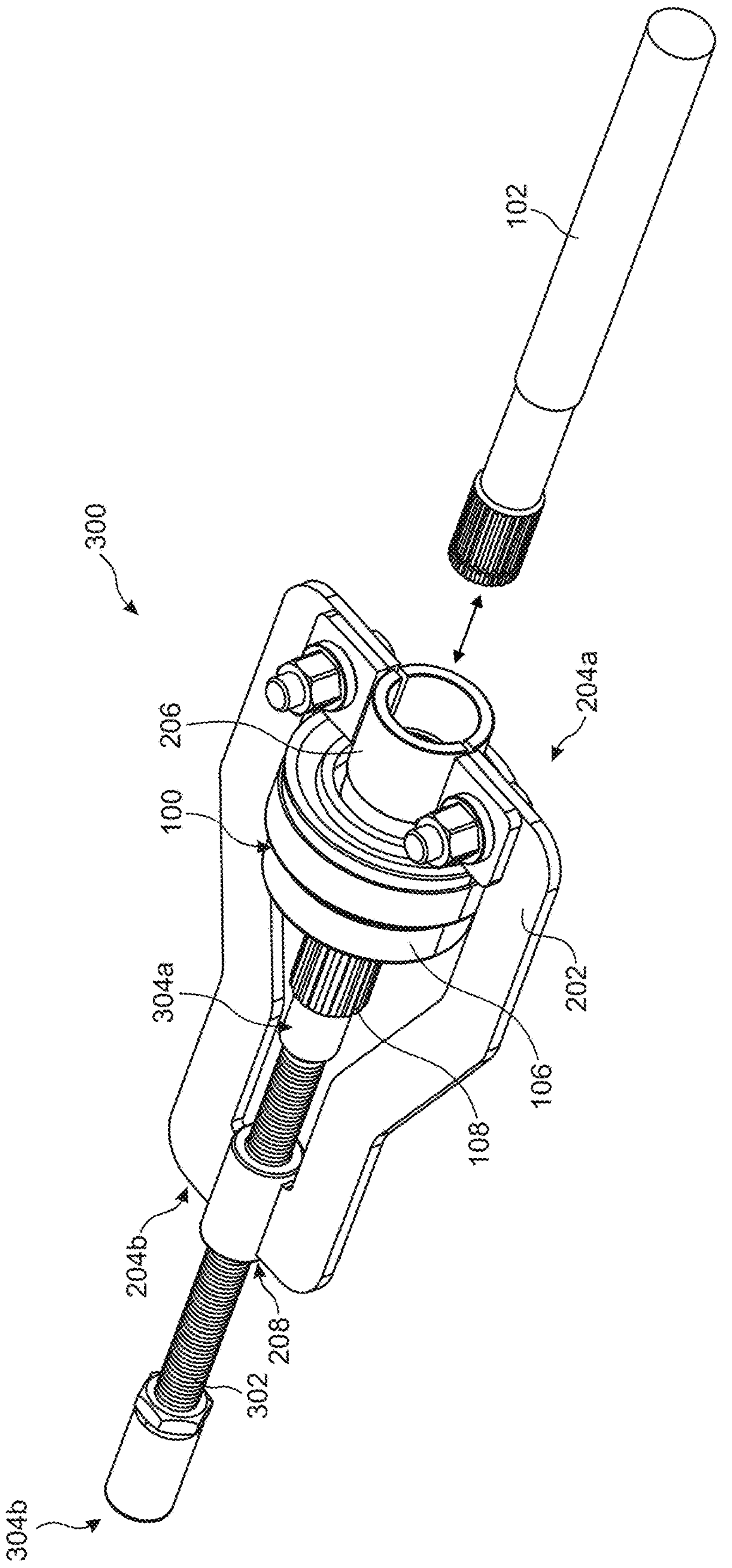
FIG. 3D is a third perspective view of the tool in FIG. 3A, after removal of the CV joint, in accordance with some embodiments.

FIGS. 3A-3D illustrate, in perspective view, the tool 300 for removing a CV joint from a driveshaft in accordance with some embodiments. More specifically, FIG. 3A illustrates the tool 300 in perspective view. FIGS. 3B, 3C, and 3D illustrates the tool 300 in a first, second and third perspective view during use. Any principles or features of the tool 200 described in the forgoing in connection with FIGS. 2A-2C are applicable to the tool 300 as illustrated herein. The same reference numerals denotes the same or similar parts.

In addition to what was described above in connection with FIG. 2A to 2C, the tool 300 illustrated herein further comprises an elongated member 302. The elongated member 302 is adjustably arranged through the connection element 208 at the second end 204*b* of the frame 202. More specifically, a position of the elongated member 302 relative the frame 202 is adjustable along the main axis A of the tool 300. In the illustrated example, the elongated member 302 is a threaded rod arranged through the hole, which constitutes the connection element 203. Thus, the position of the elongated member 302 can be adjusted along the main axis A by rotating the elongated member 302 around its own axis of extension.

FIGS. 3B-3C illustrate a scenario where the tool 300 is arranged for removing the CV joint 100 from the driveshaft 102. In this scenario, the position of the elongated member 302 has been adjusted such that is engages with the axle shaft 108 of the CV joint 100. More specifically, a first end 304*a* of the elongated member 302 is configured to engage with the axle shaft 108 attached to the housing 106 of the CV joint 100. More specifically, during use of the tool 300, the position of the elongated member 302 can be adjusted such that the first end 304*a* of the elongated member 302 abuts a distal end of the axle shaft 108 of the CV joint 100. In some embodiments, the first end 304*a* of the elongated member 302 may be tapered. The tapered end may thus engage with the axle shaft 108. More specifically, the tapered end may engage with an indent 114 on the end of the axle shaft 108 as seen in FIG. 4B. Having a tapered end of the elongated member 302 may aid in aligning the axle shaft 108 with the elongated member. Alternatively, or in combination, an end portion of the elongated member 302 may be screwed into the axle shaft 108. Having the elongated member 302 engaging with the axle shaft as described above may be advantageous in that the tool 300 and the CV joint 100 can be aligned with each other for improved load transfer during use. It may further be advantageous in that the tool 300 can be held in place onto the CV joint 100 by a clamping force between the engagement member 206 engaging the CV joint 100 from the vehicle side and the elongated member engaging the axle shaft 108 of the CV joint 100 from the wheel side. This may improve both handling of the tool 300 and the application of the applied force. Moreover, by fixing or holding the CV joint 100 in place between the engagement member 206 and the elongated member 302 improves safety during use of the tool as the CV joint 100 is kept in the tool 300 once it has been removed. Accordingly, the risk of dropping the CV joint 100 after it has been removed from the driveshaft 102 is reduced, and therefore the risk of unintentionally damaging the CV joint 100 against the floor and/or causing injury to an operator of the tool is reduced.

The elongated member 302 may comprise a further connection element 306 at a second end 304*b* of the elongated member. The further connection element 306 may be configured for receiving the force receiving member. In other words, the force receiving member may be attached to the second end 304*b* of the elongated member 302. Thus, the force may be applied to the second end 204*b* of the frame 202 through the elongated member 302. However, the force receiving member may alternatively be attached directly to the frame 202.

Looking at FIG. 3C-3D, it is illustrated two different states during use of the tool 300. In general, during use, the tool 300 is arranged such that a force, applied to the frame 202 at the second end 204*b* in a direction away from the CV joint 100, is transferred through the frame 202 to the engagement member 206 causing the engagement member 206 to engage the inner race 104, thereby removing the CV joint 100 from the driveshaft 102. In the following, the process of using the tool 300 is described in more detail.

In a first step, the frame 202 is arranged in position around the CV joint 100 such that the first end 204*a* of the frame is at the vehicle side of the CV joint 100 and the second end 204*b* is at the wheel side. In a second step, the engagement member 206 is secured around the driveshaft. In the present example, this is done by securing the first sub-member 206*a* of the engagement member 206 to the frame, while the driveshaft is arranged between the first and second sub-member 206*a*, 206*b*. In a third step, a position of the elongated member 302 is adjusted such that the first end of the elongated member 302 engages the axle shaft 108 of the CV joint 100. In a fourth step, a force N is applied to a force receiving member arranged at the second end 304*b* of the elongated member (or arranged at the second end 204*b* of the frame 202, e.g., if the elongated member 302 is omitted). The force is transferred through the frame 202 to the engagement member 206 causing the engagement member to engage the inner race 104 of the CV joint 100. The force may be a striking force. The striking force may be repeated for a number of times until the CV joint 100 is removed from the driveshaft 102 as seen in FIG. 3D. The driveshaft 102 may be attached to the vehicle, or fixed in another way.

It should be noted that the principles of using the tool 300 for removing the CV joint 100 as illustrated herein also applies to the example embodiment of the tool 200 illustrated in FIG. 2A to 2C, except without the elongated member 302 engaging the axle shaft 108. Thus, the described process is the same, except the step of positioning the elongated member 302 is omitted. The force receiving member may instead be attached to the frame 202 directly.

Figure 4A:
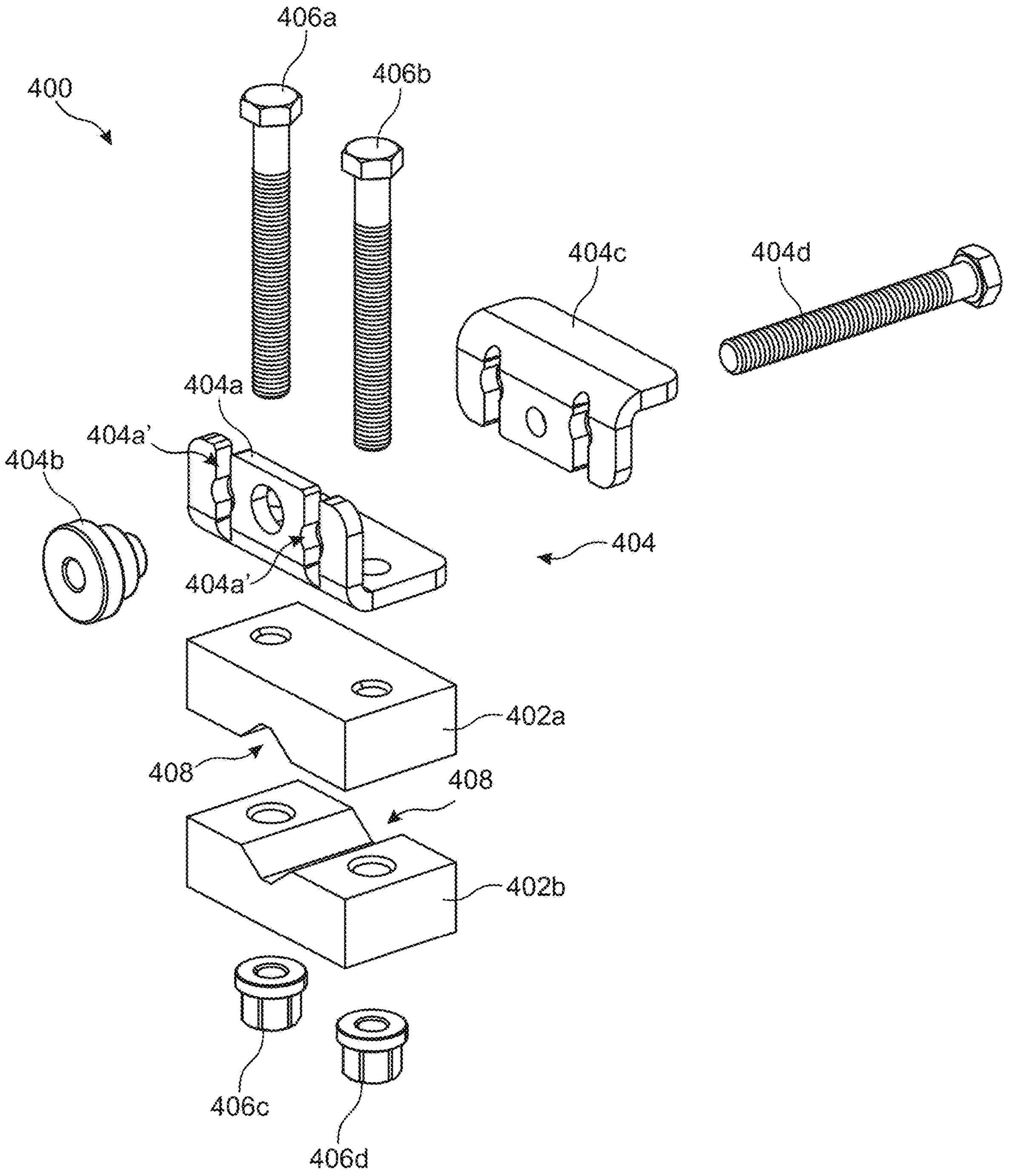
FIG. 4A is an exploded perspective view of a clamping apparatus of a tool for removing a CV joint from a driveshaft, in accordance with some embodiments.
Figure 4B:
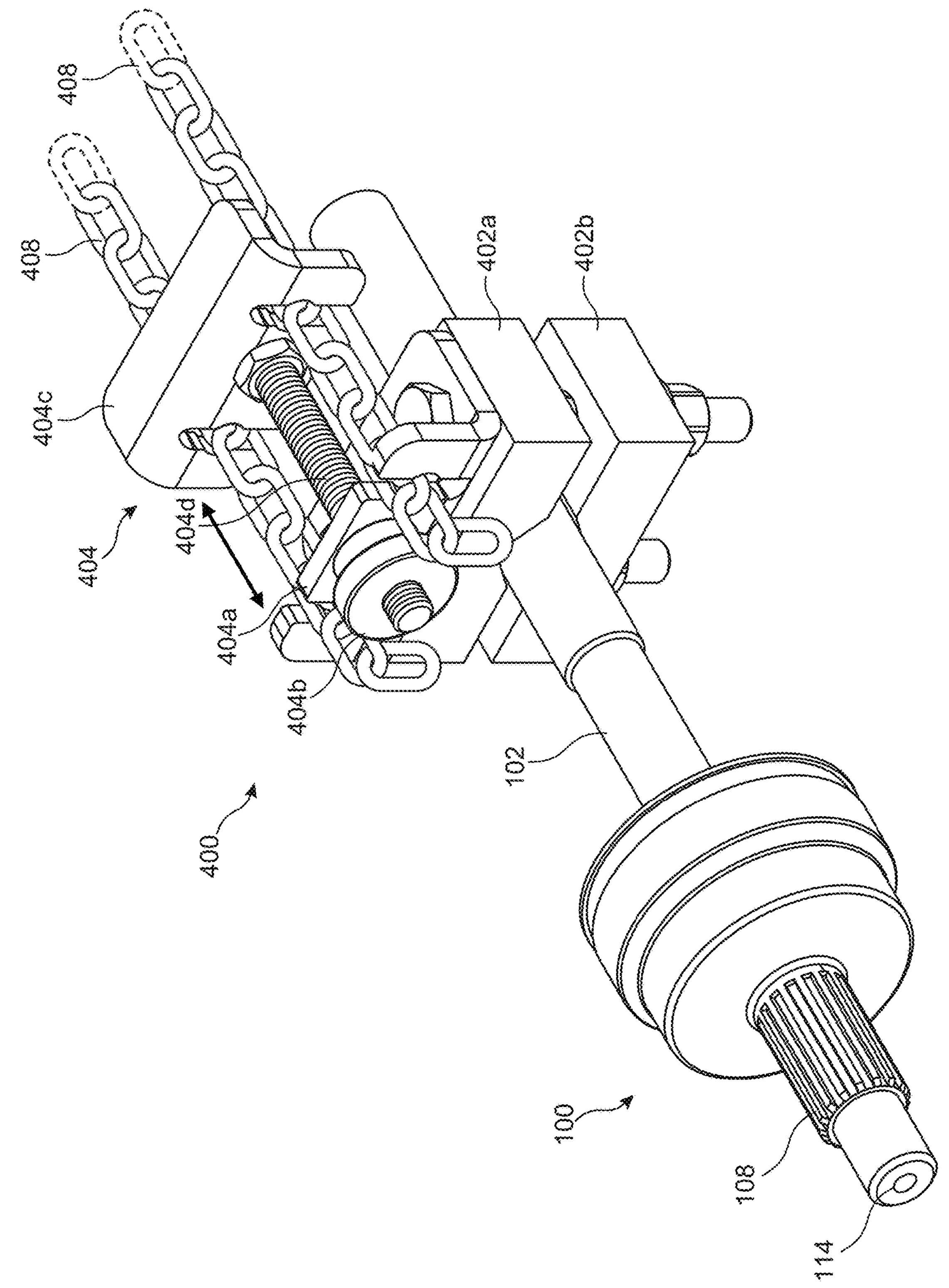
FIG. 4B is a perspective view of the clamping apparatus during use, in accordance with some embodiments.

FIG. 4A is an exploded perspective view of a clamping apparatus 400 of a tool for removing a CV joint from a driveshaft in accordance with some embodiments. FIG. 4B illustrates the clamping apparatus 400 mounted on the driveshaft 102.

The clamping apparatus 400 should be seen as an optional addition to any of the tools 200, 300 described in the forgoing. However, for the sake of explanation, reference will in the following be made to the tool 500 illustrated in FIGS. 5A and 5B, which comprises the clamping apparatus 400.

As stated above, the tool 500 further comprises a clamping apparatus 400. The clamping apparatus 400 is configured to be fixedly mounted to the driveshaft 102. The clamping apparatus 400 is further configured to be attached to a fixed attachment point of the vehicle for securing the clamping apparatus 400 to said attachment point. A possible effect of the clamping apparatus 400 during use of the tool 500 is that the driveshaft 102 can be held in place by being fixedly attached to the clamping apparatus, which is turn is fixedly attached to the fixed attachment point of the vehicle. In other words, the clamping apparatus 400 may be used to provide a force on the driveshaft which counteracts the force applied to the second end 204*b* of the tool 500. This may be particularly advantageous in the case where the other end of the driveshaft 102 (i.e. opposite from the end 110 at which the CV joint 102 is attached) is still mounted to the vehicle. When mounted to the vehicle, the other end of the driveshaft 102 is typically attached to an inner CV joint. Thus, by providing the clamping apparatus 400 on the driveshaft 102 between the outer CV joint 100 and the inner CV joint, a force on the inner CV joint as a result from the force applied to the second end 204*b* of the tool 500 can be reduced. Thus, the risk of damaging the inner CV joint may also be reduced. Such a clamping apparatus 400 can be realized in many different ways. In the following, one realization will be described as way of example.

Looking at the exploded view of FIG. 4A, the clamping apparatus 400 comprises a first and a second clamping member 402*a*, 402*b*. The first and second clamping member 402*a*, 402*b* has a respective groove 408 for receiving the driveshaft 102. The first and second clamping member 402*a*, 402*b* are configured to clamp onto the driveshaft 102 by being pressed against each other from opposite sides of the driveshaft 102 (as seen e.g., in FIG. 4B). Thus, the clamping apparatus 400 is fixedly mounted to the driveshaft 102 through the first and second clamping member 402*a*, 402*b*. The first and second clamping member 402*a*, 402*b* are herein secured against each other (i.e., attached together) through a pair of screws 406*a*, 406*b* and bolts 406*c*, 406*d*. However, other fastening means may be used as well.

In order to secure the clamping apparatus 400 to the fixed attachment point of the vehicle, the clamping apparatus 400 illustrated herein comprises a securing arrangement 404. The securing arrangement 404 is configured to receive a flexible connection member 408 (e.g., as seen in FIG. 4B) connected to the fixed attachment point of the vehicle, thereby securing the clamping apparatus 400 to the fixed attachment point. By the wording “flexible” as in “flexible connecting member”, it is herein meant that the connecting member flexible while still having a high tensile strength. For example, the connecting member may be bendable such that it can be wrapped around an object, as opposed to being a rigid structure, such as a metal beam. The flexible connection member 408 may for instance be a chain, as in the illustrated example of FIG. 4B. Alternatively, the flexible connection member may be a rope, metal wire, cable or the like. Using a flexible connection member may be advantageous in that it simplifies the process of securing the clamping apparatus 400 to different points on the vehicle.

In the illustrated example, the flexible connection member 408 (or chain) is connected to the fixed attachment point by being wrapped around it. A first and second end of the chain are then attached to the securing arrangement 404. As another example, one end of the flexible connection member 408 may be attached to the fixed attachment point of the vehicle, while the other end is attached to the securing arrangement 404. The flexible connection member 408 may be seen as a part of the securing arrangement 404.

In the broadest example, the securing arrangement 404 comprises a securing member 404*a*. The securing member 404*a* comprises a pair of slots 404*a*' configured to receive the chain. The securing member 404*a* is herein a separate part from the first clamping member 402*a* and attached thereto by the pair or screws 406*a*, 406*b* and bolts 406*c*, 406*d*. However, the securing member 404*a* may alternatively be an integral part of the first clamping member 402*a*.

The securing arrangement 404 may further comprise a tensioning device 404*b-d* as illustrated herein. The tensioning device 404*b-d* is configured for tensioning the flexible connection member 408 received by the securing arrangement 404. The tensioning device herein comprises a further securing member 404*c* configured to receive the flexible connecting member 408. The further securing member 404*c* is connected to the securing member 404*a* through a further screw 404*d* and bolt 404*b*. The further securing member 404*c* is arranged such that a distance between the securing member 404*a* and the further securing member 404*c* can be adjusted by adjustment of the further screw 404*d* and bolt 404*b*. The adjustment of the distance is in FIG. 4B illustrated by the bold arrow. By reducing the distance, the flexible connecting member 408 can be tensioned.

Having a tensioning device 404*b-d* such as the one described in the forgoing may be advantageous in that is simplifies the process of securing the clamping apparatus 400. It may be particularly advantageous when a chain is used, since the distance between links of the chain may not match up with a distance to the fixed attachment point, thus resulting in a lose chain. This can be mitigated by use of the tensioning device 404*b-d*.

Figure 5A:
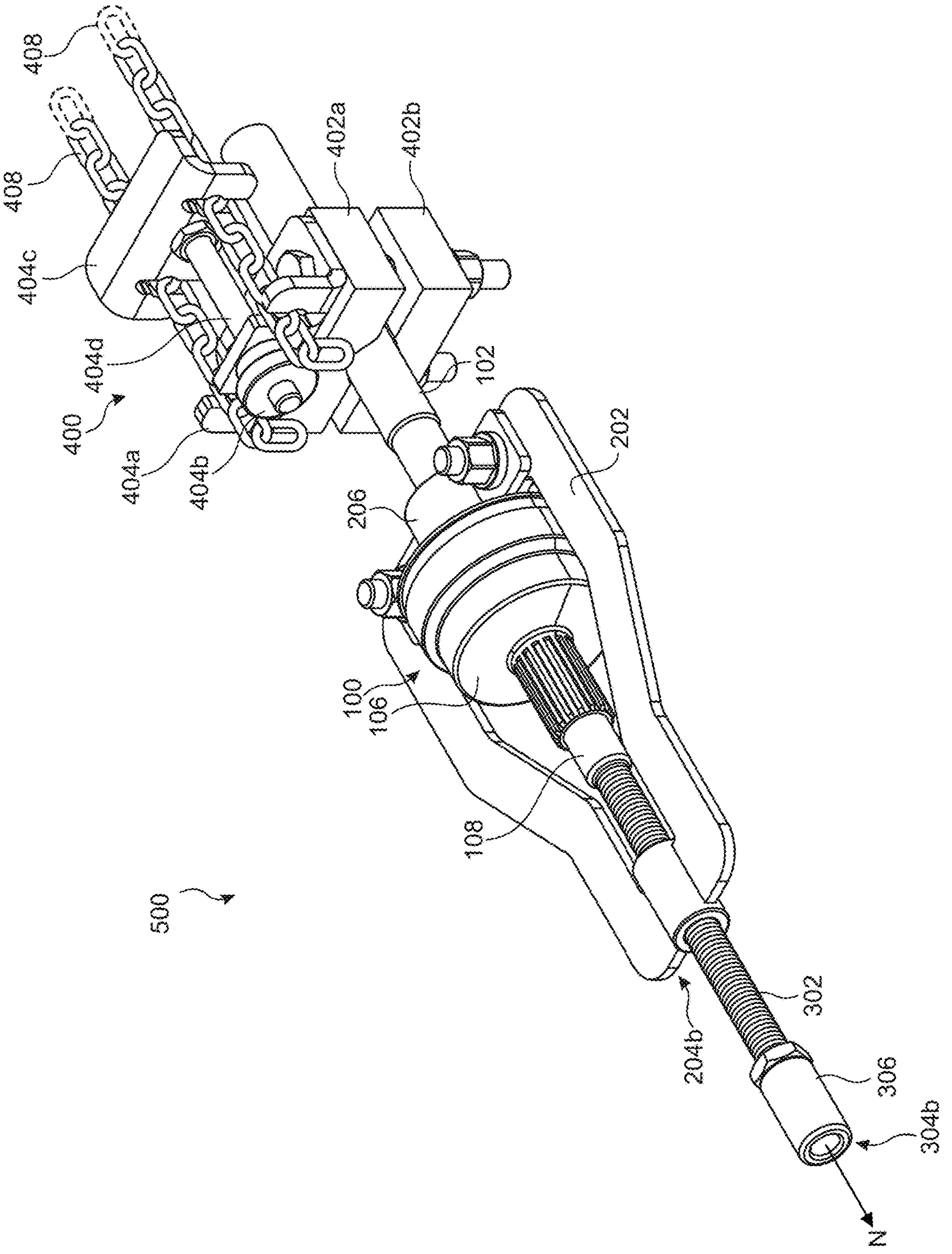
FIG. 5A is a perspective view of a tool for removing a CV joint from a driveshaft comprising the clamping apparatus in according to some embodiments, during use, in accordance with some embodiments.
Figure 5B:
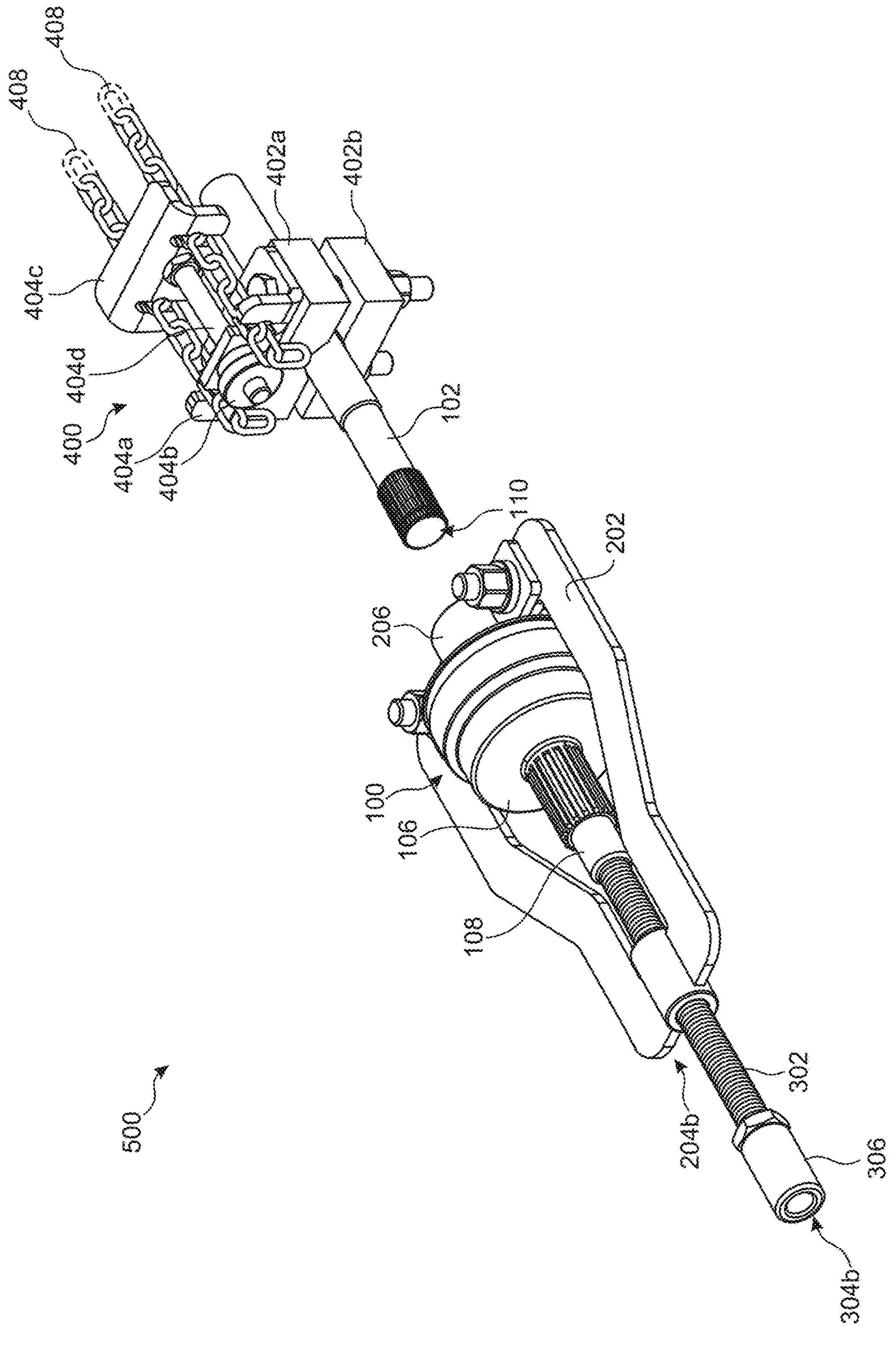
FIG. 5B is a perspective view of the tool for removing a CV joint from a driveshaft comprising the clamping apparatus in according to some embodiments, after removal of the CV joint, in accordance with some embodiments.

Turning now to FIGS. 5A and 5B, the tool 500 for removing a CV joint 100 from a driveshaft 102 is shown in perspective view during use. More specifically, FIG. 5A shows the tool 500 in use at a point in time when the force N is applied, while FIG. 5B shows a point in time after the CV joint 100 has been removed from the driveshaft 102.

The tool 500 comprises the clamping apparatus 400 as described above in connection with FIGS. 4A and 4B. For a description of the structure and components of the tool 500, reference is made to above.

The process of using the tool 500 is the same as described above in connection with FIG. 3A to 3D with the addition of the following steps.

In a fifth step, the clamping apparatus 400 is attached to the driveshaft 102. More specifically, the clamping apparatus 400 is attached to the driveshaft 102 at a position between the outer CV joint 100 and an inner CV joint. The clamping apparatus 400 may be attached to the driveshaft 102 by mounting the first and second clamping member 402*a*, 402*b* to the driveshaft.

In a sixth step, the clamping device is secured to a fixed attachment point of the vehicle. More specifically, the flexible connecting member 408 may be connected to the fixed attachment point and to the clamping apparatus 400.

Optionally, in a seventh step, the flexible connecting member 408 may be tensioned by adjusting a tensioning device 404*b-d* of the clamping apparatus 400.

It should be noted that the fifth through seventh step should be performed prior to the fourth step (as described above) of applying the force N (as shown in FIG. 5A). Further, as is readily understood, steps of the process of using the tool 500 may be interchanged, or performed concurrently to some extent. For example, the steps relating to the clamping apparatus 400 may be performed either before or after arranging the frame 202 and engagement member 206 around the CV joint 100.

The invention has mainly been described above with reference to specific exemplifying embodiments, many different alterations, modifications and the like will become apparent for those skilled in the art. For instance, the shape of the different components of the tool 200, 300, 500 can be realized in many different ways while still achieving the functional principles of the tool as described herein. As an example, the frame 202 of the tool 200, 300, 500 is herein illustrated having extension members 210*a*, 210*b* made of a generally flat piece of e.g., metal. However, the extension members 210*a*, 210*b* may as well have a different cross-sectional shape.

The invention claimed is:

1. A tool for removing a constant velocity joint from a driveshaft of a vehicle, comprising:

a frame comprising a first end and a second end, wherein the frame is configured to extend around a housing of the constant velocity joint such that, during use, the first end of the frame is arranged at a vehicle side of the constant velocity joint and the second end of the frame is arranged at a wheel side of the constant velocity joint; and an engagement member arranged at the first end of the frame, wherein the engagement member is configured to at least partly enclose the driveshaft and to engage with an inner race of the constant velocity joint from the vehicle side of the constant velocity joint;

wherein, during use, the tool is arranged such that a force applied to the frame at the second end of the frame in a direction away from the constant velocity joint is transferred through the frame to the engagement member causing the engagement member to engage the inner race of the constant velocity joint, thereby removing the constant velocity joint from the driveshaft.

2. The tool of claim 1, wherein the second end of the frame comprises a connection element.

3. The tool of claim 2, wherein the connection element comprises a threaded hole.

4. The tool of claim 2, wherein:

the tool comprises an elongated member adjustably arranged through the connection element at the second end of the frame; and a first end of the elongated member is configured to engage with an axle shaft attached to the housing of the constant velocity joint.

5. The tool of claim 4, wherein a position of the elongated member relative the frame is adjustable along a main axis of the tool.

6. The tool of claim 4, wherein the elongated member comprises a threaded rod.

7. The tool of claim 1, wherein the tool comprises a force receiving member arranged at the second end of the frame, the force receiving member configured to receive the applied force during use.

8. The tool of claim 2, wherein the tool comprises a force receiving member attached to the connection element of the second end of the frame, the force receiving member configured to receive the applied force during use.

9. The tool of claim 4, wherein the tool comprises a force receiving member attached to a second end of the elongated member, the force receiving member configured to receive the applied force during use.

10. The tool of claim 7, wherein the force receiving member comprises a sliding hammer.

11. The tool of claim 7, wherein the force receiving member is adapted to receive a hammer blow.

12. The tool of claim 1, wherein the engagement member is at least partly removably attached to the first end of the frame.

13. The tool of claim 1, wherein the tool comprises a clamping apparatus configured to be fixedly mounted to the driveshaft and to be attached to a fixed attachment point of the vehicle for securing the clamping apparatus to the fixed attachment point.

14. The tool of claim 13, wherein the clamping apparatus comprises a securing arrangement configured to receive a flexible connection member connected to the fixed attachment point of the vehicle, thereby securing the clamping apparatus to the fixed attachment point.

15. The tool of claim 14, wherein the securing arrangement comprises a tensioning device for tensioning the flexible connection member received by the securing arrangement.

16. A tool for removing a constant velocity joint from a driveshaft of a vehicle, comprising:

a frame comprising a first end and a second end, wherein the frame extends around a housing of the constant velocity joint such that, during use of the tool, the first end of the frame is arranged at a vehicle side of the constant velocity joint and the second end of the frame is arranged at a wheel side of the constant velocity joint;

an engagement member arranged at the first end of the frame, wherein the engagement member, during use of the tool, at least partly encloses the driveshaft and engages an inner race of the constant velocity joint from the vehicle side of the constant velocity joint; and a force receiving member arranged the second end of the frame;

wherein, during use of the tool, the tool is arranged such that a force applied to the frame at the second end of the frame in a direction away from the constant velocity joint is received by the force receiving member and transferred through the frame to the engagement member causing the engagement member to engage the inner race of the constant velocity joint, thereby removing the constant velocity joint from the driveshaft.

17. The tool of claim 16, wherein:

the second end of the frame comprises a connection element;

the tool comprises an elongated member that is adjustably arranged through the connection element; and during use of the tool, a first end of the elongated member engages an axle shaft attached to the housing of the constant velocity joint.

18. The tool of claim 16, wherein:

the tool comprises a clamping apparatus configured to be fixedly mounted to the driveshaft and to be attached to a fixed attachment point of the vehicle;

the clamping apparatus comprises a securing arrangement configured to receive a flexible connection member connected to the fixed attachment point of the vehicle, thereby securing the clamping apparatus to the fixed attachment point; and the securing arrangement comprises a tensioning device for tensioning the flexible connection member received by the securing arrangement.

19. A tool for removing a constant velocity joint from a driveshaft of a vehicle, comprising:

a frame comprising a first end and a second end, wherein the frame extends around a housing of the constant velocity joint such that, during use of the tool, the first end of the frame is arranged at a vehicle side of the constant velocity joint and the second end of the frame is arranged at a wheel side of the constant velocity joint;

an engagement member arranged at the first end of the frame, wherein the engagement member, during use of the tool, at least partly encloses the driveshaft and engages an inner race of the constant velocity joint from the vehicle side of the constant velocity joint; and a clamping apparatus configured to be fixedly mounted to the driveshaft and to be attached to a fixed attachment point of the vehicle;

wherein, during use of the tool, the tool is arranged such that a force applied to the frame at the second end of the frame in a direction away from the constant velocity joint is transferred through the frame to the engagement member causing the engagement member to engage the inner race of the constant velocity joint, thereby removing the constant velocity joint from the driveshaft.

20. The tool of claim 19, wherein:

the second end of the frame comprises a connection element;

the tool comprises an elongated member that is adjustably arranged through the connection element; and during use of the tool, a first end of the elongated member engages an axle shaft attached to the housing of the constant velocity joint.

* * * * *